US005614580A

United States Patent [19]
Zanzig et al.

[11] Patent Number: 5,614,580
[45] Date of Patent: Mar. 25, 1997

[54] TIRE WITH SILICA REINFORCED TREAD

[75] Inventors: David J. Zanzig, Uniontown; Paul H. Sandstrom, Tallmadge; Michael J. Crawford, Akron; John J. A. Verthe, Kent; Cheryl A. Losey, Tallmadge, all of Ohio

[73] Assignee: The Goodyear Tire & Rubber Company, Akron, Ohio

[21] Appl. No.: 469,114

[22] Filed: Jun. 6, 1995

Related U.S. Application Data

[63] Continuation of Ser. No. 116,623, Sep. 7, 1993, abandoned.

[51] Int. Cl.⁶ ........................................... C08K 3/00
[52] U.S. Cl. ................... 524/492; 524/493; 524/495; 524/496
[58] Field of Search ............................... 524/492, 493, 524/495, 496

[56] References Cited

U.S. PATENT DOCUMENTS

| | | | |
|---|---|---|---|
| 4,192,366 | 3/1980 | Scriver, Jr. et al. | 152/209 |
| 4,220,564 | 9/1980 | Tanimoto et al. | 260/5 |
| 4,224,197 | 9/1980 | Ueda et al. | 260/5 |
| 4,278,587 | 7/1981 | Wolff et al. | 260/42.37 |
| 4,519,430 | 5/1985 | Ahmad et al. | 152/209 |
| 4,522,976 | 6/1985 | Scriver et al. | 524/447 |
| 5,227,425 | 7/1993 | Rauline | 524/493 |

*Primary Examiner*—Edward J. Cain
*Attorney, Agent, or Firm*—Henry C. Young, Jr.

[57] ABSTRACT

The invention relates to a tire with a tread which is quantitatively reinforced with silica where the tread is composed of cis 1,4-polybutadiene rubber, a high vinyl polybutadiene rubber and, optionally a medium vinyl polybutadiene rubber. In one aspect, the tread rubber can also contain a minor amount of cis 1,4-polyisoprene natural rubber.

11 Claims, No Drawings

TIRE WITH SILICA REINFORCED TREAD

This is a continuation of application Ser. No. 08/116,623, filed Sep. 7, 1993, abandoned.

FIELD

This invention relates to a tire having a rubber tread which is reinforced with silica. In one aspect, the tread is comprised of a specified multiple component rubber blend reinforced with a quantitative amount of silica or a combination of silica and carbon black. In one aspect, the tread rubber is required to be composed of cis 1,4-polybutadiene rubber and high vinyl polybutadiene rubber and, optionally, medium vinyl polybutadiene rubber.

BACKGROUND

Pneumatic rubber tires are conventionally prepared with a rubber tread which can be a blend of various rubbers which is typically reinforced with carbon black.

In one aspect, rubbers are evaluated, selected and blended for a purpose of achieving desired tire tread properties and particularly a balance of tire tread characteristic properties, mainly, rolling resistance, traction and wear.

For various applications utilizing rubber including applications such as tires and particularly tire treads, sulfur cured rubber is utilized which contains substantial amounts of reinforcing filler(s). Carbon black is commonly used for such purpose and normally provides or enhances good physical properties for the sulfur cured rubber. Particulate silica is also sometimes used for such purpose, particularly when the silica is used in conjunction with a coupling agent. In some cases, a combination of silica and carbon black is utilized for reinforcing fillers for various rubber products, including treads for tires.

Various rubber compositions have been prepared for various purposes, some of which have included tire treads, which contain a polybutadiene containing a degree of 1,2-configuration, sometimes referred to as vinyl content. Representative of such various compositions include those, for example, taught in various patent specifications such as U.S. Pat. No. 3,937,681 relating to a tire tread of polybutadiene containing twenty-five to fifty percent of its monomer units in a 1,2-position. British patent 1,166,832 relates to a tire tread of "high vinyl" butadiene rubber containing at least fifty percent of its monomer units in a 1,2-position. U.S. Pat. No. 4,192 relates to a composition of "medium vinyl" polybutadiene and blends thereof with natural rubber where such composition is required to contain a certain carbon black. US patent 3,978,165 relates to a composition, taught to be useful for tire treads composed of (a) "medium vinyl" polybutadiene, (b) polybutadiene and (c) butadiene/styrene rubbers. German DE No. 2936-72 relates to mixtures of polybutadiene containing 35–70 percent of 1,2- units mixed with polyisoprene rubber and, optionally, with cis polybutadiene or styrene/butadiene rubber for tires. U.S. Pat. Nos. 3,827,991, 4,220,564 and 4,224,197 relate to combinations of polybutadiene containing at least seventy percent of 1,2-configuration with various other rubbers. U.S. Pat. No. 4,192,366 relates to a tire with tread of a blend of cis-polyisoprene rubber and a medium vinyl polybutadiene rubber cured with an excess of sulfur. U.S. Pat. No. 4,530,959 relates to a tire with tread composed of medium vinyl polybutadiene, cis 1,4-polyisoprene rubber and styrene/butadiene copolymer rubber in which the medium vinyl polybutadiene rubber can be prepared by polymerizing butadiene in the presence of a polar modifier and divinyl benzene in accordance with the teachings of U.S. Pat. No. 4,230,841.

It is important to appreciate that, conventionally, carbon black is considered to be a more effective reinforcing filler for rubber tire treads than silica if the silica is used without a coupling agent.

Indeed, at least as compared to carbon black, there tends to be a lack of, or at least an insufficient degree of, physical and/or chemical bonding between the silica particles and the rubber elastomers to enable the silica to become a reinforcing filler for the rubber for most purposes, including tire treads, if the silica is used without a coupler. While various treatments and procedures have been devised to overcome such deficiencies, compounds capable of reacting with both the silica surface and the rubber elastomer molecule, generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are generally composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself. Usually the rubber reactive component of the coupler is temperature sensitive and tends to combine with the rubber during the final and higher temperature sulfur vulcanization stage and, thus, subsequent to the rubber/silica/coupler mixing stage and, therefore, after the silane group of the coupler has combined with the silica. However, partly because of typical temperature sensitivity of the coupler, some degree of combination, or bonding, may occur between the rubber-reactive component of the coupler and the rubber during an initial rubber/silica/coupler mixing stages and, thus, prior to a subsequent vulcanization stage.

The rubber-reactive group component of the coupler may be, for example, one or more of groups such as mercapto, amino, vinyl, epoxy, and sulfur groups, preferably a sulfur or mercapto moiety and more preferably sulfur.

Numerous coupling agents are taught for use in combining silica and rubber, such as for example, silane coupling agents containing a polysulfide component, or structure, such as bis-(3-triethoxysilylpropyl) tetrasulfide (e.g. U.S. Pat. No. 3,873,489).

For silica reinforced tire treads, U.S. Pat. No. 5,066,721, in its Comparative Test Example 1 in Table 3 (column 15), discloses the use of solution polymerization prepared SBR containing 50 parts silica for a tire tread. Table 4 (column 17) illustrates the tire preparation. U.S. Pat. No. 5,227,425 also discloses the use of a solution polymerization prepared SBR which is silica reinforced and in which is preferenced over an emulsion polymerization prepared SBR. U.S. Pat. No. 4,519,430 discloses a silica rich tire tread which contains solution or emulsion SBR, optionally with polybutadiene rubber and/or polyisoprene rubber together with a mixture of silica and carbon black, with silica being required to be a major component of the silica/carbon black reinforcing filler. EPO application 447,066 discloses a rubber composition for a tire tread composed of silica and silane coupling agent with rubbers composed of polybutadiene or styrene/butadiene copolymer prepared with an organic alkali metal initiator and which may also contain other specified rubbers.

Other U.S. patents relating to silicas and silica reinforced-tire treads include U.S. Pat. Nos. 3,451,458; 3,664,403; 3,768,537; 3,873,489; 3,884,285; 3,938,574; 4,482,663; 4,590,052, 5,089,554 and British 1,424,503.

SUMMARY AND PRACTICE OF THE INVENTION

In accordance with this invention, a pneumatic tire is provided having a tread comprised of, based on 100 parts by weight rubber, (A) at least two diene-based elastomers comprised of (i) about 10 to about 50, preferably about 20 to about 35, phr of cis 1,4-polybutadiene rubber, (ii) about 0 to about 90, preferably about 30 to about 70, phr of medium vinyl polybutadiene rubber having a vinyl content in a range of about 30 to about 60, preferably about 40 to about 50, weight percent, and (iii) about 0 to about 90, preferably about 40 to about 70, phr of a high vinyl polybutadiene rubber having a vinyl content in a range of about 60 to about 95, preferably about 70 to about 80, weight percent; wherein the total of said medium and high vinyl polybutadiene rubbers is in a range of about 50 to about 90, preferably about 65 to about 75, phr, (B) about 50 to about 110, preferably about 60 to about 85, phr particulate silica, (C) at least one silica coupler having a silane moiety reactive with silicon dioxide and a sulfur moiety reactive with said elastomer, in a weight ratio of silica to coupler of about 7/1 to about 15/1, and (D) about 0 to about 50 phr carbon black, wherein the weight ratio of silica to carbon black, if carbon black is used, is at least 2/1, preferably at least 4/1 and more preferably at least 10/1 and where the total of silica and carbon black, if used, is about 60 to about 120, preferably about 70 to about 90 phr.

In one aspect of the invention, the tire tread rubber can also contain about 5 to about 20 phr of cis-1,4 polyisoprene rubber.

The term "phr" as used herein, and according to conventional practice, refers to "parts of a respective material per 100 parts by weight of rubber".

The rubber blends containing the aforesaid high silica loading, including the silica coupler, in combination with the defined rubbers, which include the medium vinyl polybutadiene rubbers, is an important feature of the invention designed to enhance properties of a tire tread containing a substantial amount of silica reinforcement.

In one aspect, the medium vinyl (MVBD) polybutadiene rubber is considered herein to be beneficial to rolling resistance and traction, the high vinyl (HVBD) polybutadiene rubber is beneficial to traction and the combination of the MVBD and HVBD rubbers, in the aforesaid amounts, is beneficial to rolling resistance and traction.

The medium vinyl polybutadiene typically has about 10 to about 40 percent of its monomer units in a cis 1,4-configuration and, after allowing for the medium vinyl content (1,2-monomer configuration), the remainder of the polymer is considered to be of monomer units in a trans 1,4-configuration.

The medium vinyl polybutadiene, in its unvulcanized state, can typically be additionally characterized by having a ML-4 (100° C.) viscosity in the range of about 40 to about 120.

These polybutadienes, particularly those in the higher ML-4 viscosity range, can optionally be individually oil extended before mixing with various rubber compounding materials for ease of processing. If oil extension is used, usually about 15 to about 35 phr of rubber processing oil is used, usually of the aromatic or aromatic/paraffinic oil type, to provide a ML-4 (100° C.) viscosity of about 40–80.

The invention can be practiced with medium vinyl polybutadiene rubber produced by various processes, such as those already known in the art.

However, it is a particularly desirable feature of this invention that a particular type of medium vinyl polybutadiene be used. Although the mechanism, precise physical or chemical property or polymer structure effect is not understood, at least one of or a combination of, depending on the tire and its service conditions, tire properties have been observed to be further enhanced by using such particular medium vinyl polybutadiene. Such enhanced tire properties include at least one of or a combination of rolling resistance, skid resistance and tread wear.

Such preferred medium vinyl polybutadiene is of the type prepared by polymerizing 1,3-butadiene with a very small amount of divinylbenzene in an essentially polar aromatic solvent with an alkyl lithium catalyst and at least one polar catalyst modifier as described in U.S. Pat. No. 4,230,841 which is incorporated herein by reference. Various polar modifiers are prescribed in the patent, of which the strong catalyst modifiers are exemplified such as mexamethyl phosphoric acid triamide (HMPA), N,N,N',N'-tetramethylethylene diamine (TMEDA), ethylene glycol dimethyl ether (glyme), diethylene glycol dimethyl ether (diglyme), triethylene glycol dimethyl ether (triglyme) and tetraethylene glycol dimethyl ether (tetraglyme).

In the practice of this invention, the medium vinyl content of the required polybutadiene refers to the weight percent of content of the polymer in the 1,2-configuration.

The cis 1,4-polybutadiene rubber (PBD) is considered herein to be beneficial to enhance the tire tread's wear, or treadwear.

Such PBD can be prepared, for example, by organic solution polymerization of 1,3-butadiene.

The PBD may be conventionally characterized, for example, by having at least a 90% cis 1,4-content.

The cis 1,4-polyisoprene natural rubber is well known to those having skill in the rubber art.

Thus, in the practice of this invention, a balanced rubber blend of at least two rubbers is provided which relies upon silica reinforcement which, in turn, relies on a silica coupler for the silica's reinforcing effect for the rubber blend.

In another aspect, when such sulfur vulcanized rubber tread also may contain carbon black a weight ratio of silica to carbon black is at least about 2/1, preferably at least about 4/1 and for some applications at least 10/1.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

The siliceous pigment (silica) should, for example, have an ultimate particle size in a range of 50 to 10,000 angstroms, preferably between 50 and 400 angstroms. The BET surface area of the pigment, as measured using nitrogen gas, is preferably in the range of about 100 to about 250, preferably about 120 to about 180, square meters per gram. The BET method of measuring surface area is described in the *Journal of the American Chemical Society*, Volume 60, page 304 (1930).

The silica also typically has a dibutylphthalate (DBP) absorption value in a range of about 200 to about 400, and usually about 220 to about 300.

The silica might be expected to have an average ultimate particle size, for example, in a range of about 0.01 to. 0.05 micron as determined by the electron microscope, although the silica particles may be even smaller in size.

While the "projected" area of silicas, before and after mixing with rubber, has been sometimes taught to be suitable to characterize various silicas, it is considered that such characterizations are insufficient, or unreliable unless adequate sample preparation is designated and defined because the electron microscope determination of projected area of the silica is considered to be largely dependent upon sample preparation. Preparation variables include sample container size and mixing energy and need to be clarified in complete detail.

Various commercially available silicas may be considered for use in this invention such as, for example only and without limitation, silicas commercially available from PPG Industries under the Hi-Sil trademark with designations 210, 243, etc; silicas available from Rhone-Poulenc, with designations of Zl165MP and Z165GR and silicas available from Degussa AG with designations VN2 and VN3, etc. The PPG Hi-Sil silicas are preferred.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black, for this invention, if used, are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to uhose skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. Retarders are also used the rate of vulcanization. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary or and a secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent.

The presence and relative amounts of the above additives are not considered to be an aspect of the present invention which is more primarily directed to the utilization of specified blends of rubbers in tire treads, in combination with silica and silica coupler.

The tire can be built, shaped, molded and cured by various methods which will be readily apparent to those having skill in such art.

The invention may be better understood by reference to the following examples in which the parts and percentages are by weight unless otherwise indicated.

EXAMPLE I

Rubber compositions (compounded rubber) were prepared of various blends of cis 1,4-polybutadiene rubber (PBD) with high vinyl polybutadiene (HVBD) and medium vinyl polybutadiene (MVBD) to herein as Samples B through D.

A control rubber composition composed of solution polymerization prepared styrene/butadiene copolymer rubber (S-SBR) and cis 1,4-polybutadiene rubber (PBD) was prepared and identified herein as Sample A.

The rubber compositions were prepared by mixing the ingredients in several stages, namely, two non-productive stages (without the curatives) and a productive stage (basically for the curatives), then the resulting composition was cured under conditions of elevated temperature and pressure.

For the non-productive mixing stages, exclusive of the accelerator(s), sulfur curatives zinc oxide and antioxidant which are mixed (added) in the final, productive mixing stage, all of the ingredients were mixed in the first non-productive stage except for about 20 to about 50 percent of the reinforcing fillers (silica or carbon black), with proportional amounts (to the reinforcing fillers) of coupler and processing oil, which were added in the second non-productive mixing stage. The ingredients were mixed in each of the non-productive mixing stages for about 5 minutes to a temperature of about 165° C., all in a Banbury type of mixer. To the resulting rubber composition (mixture) was then mixed, in the productive mixing stage, the remaining ingredients in a Banbury type mixer for about 2 minutes to a temperature of about 110° C. The rubber was then vulcanized at a temperature of about 150° C. for about 18 minutes.

The rubber compositions were comprised of the ingredients illustrated in Table 1. Table 2 illustrates properties of the cured rubber compositions.

TABLE 1

| Sample # | A | B | C | D |
|---|---|---|---|---|
| Non-Productive Mix Stages | | | | |
| S-SBR[4] | 75 | 0 | 0 | 0 |
| PBD[3] | 25 | 30 | 20 | 30 |
| MVBD[2] | 0 | 70 | 30 | 30 |
| HVBD[1] | 0 | 0 | 30 | 30 |
| NR (polyisoprene)[5] | 0 | 0 | 20 | 110 |
| Processing Oil, aromatic | 35 | 35 | 35 | 35 |
| Fatty Acid | 2 | 2 | 2 | 2 |
| Silica[6] | 80 | 80 | 80 | 80 |
| Plasticizers, resins and waxes | 14 | 14 | 14 | 14 |
| Coupling Agent[7] | 12 | 12 | 12 | 12 |
| Productive Mix Stage | | | | |
| Zinc Oxide | 4 | 4 | 4 | 4 |
| Antioxidant(s)[8] | 2.7 | 2.7 | 2.7 | 2.7 |
| Sulfur | 1 | 1 | 1 | 1 |
| Sulfenamide and Thiuram Type Accelerator(s) | 4 | 4 | 4 | 4 |

[1)]A high vinyl polybutadiene rubber having a vinyl content of about 65 weight percent and a cis 1,4-content of about 16 percent obtained from The Goodyear Tire & Rubber Company.
[2)]A medium vinyl polybutadiene rubber obtained from The Goodyear Tire & Rubber Company having a vinyl content of about 45 weight percent and a cis 1,4-content of about 20 percent.
[3)]Cis 1,4-polybutadiene rubber obtained as Budene ® 1207 from The Goodyear Tire & Rubber Company.
[4)]A solution polymerization prepared styrene/butadiene copolymer rubber having about 23.5 percent bound styrene, 45 percent vinyl and a Tg of −36° C., obtained as Duradene 715 from the Firestone Synthetic Rubber & Latex Company.
[5)]cis 1,4-polyisoprene natural rubber.
[6)]A silica obtained as Hi-Sil 210 from PPG Industries.
[7)]obtained as bis-3-triethoxysilylpropyl) tetrasulfide (50% active) commercially available as X50S from Degussa as a 50/50 blend of the tetrasulfide with N330 carbon black (thus, considered 50% active).
[8)]Of the diarylparaphenylene diamine and dihydro-trimethylquinoline type

TABLE 2

| Sample # | A | B | C | D |
|---|---|---|---|---|
| Rheometer (150° C.) | | | | |
| Max. Torque, dNm | 19.4 | 23.8 | 22.4 | 22.6 |
| Min. Torque, dNm | 2.7 | 5.2 | 6.3 | 5.5 |
| $T_{90}$, minutes | 18.0 | 19.5 | 16.5 | 17.1 |
| $T_{25}$, minutes | 10.3 | 12.5 | 11.1 | 11.3 |
| Stress-Strain | | | | |
| Tensile Strength, MPa | 12.5 | 11.7 | 12.8 | 11.8 |
| Elongation at break, % | 464 | 444 | 401 | 398 |
| 100% Modulus, MPa | 2.6 | 2.5 | 2.8 | 2.8 |
| 300% Modulus, MPa | 8.3 | 8.0 | 9.9 | 9.2 |
| Rebound | | | | |
| 100° C., (%) | 56 | 63 | 66 | 65 |
| 23° C. (%) | 32 | 47 | 48 | 48 |
| Hardness (Shore A) | | | | |
| 23° C. | 65 | 64 | 64 | 65 |
| 100° C. | 60 | 61 | 60 | 61 |
| DIN Abrasion (Relative Volume Loss) | | | | |
| $cm^3$ | 131 | 82 | 87 | 83 |
| Dynamic Mechanical Properties | | | | |
| E* at 60° C., MPa | 13.7 | 11.6 | 10.0 | 12.4 |
| E* at 0° C., MPa | 30.0 | 21.6 | 20.9 | 25.4 |
| Tan Delta at 60° C. | 0.113 | 0.104 | 0.079 | 0.08 |
| Tan Delta at 0° C. | 0.241 | 0.172 | 0.164 | 0.149 |

These properties of the rubber compositions demonstrate excellent rolling resistance and treadwear.

Samples B, C and D demonstrated significantly higher rebound and abrasion resistance and lower tan delta @ 60° as compared to Sample A, is indicative of improved rolling resistance and treadwear when the composition is used as a tire tread.

Samples C and D further demonstrated a higher 300 percent modulus and 300 percent modulus to 100 percent modulus ratio as compared to Control Sample A which is indicative of improved polymer-silica interaction for a tire with a tread of such composition.

In this Example, the preferred medium vinyl polybutadiene rubber was used. Such rubber was of the hereinbefore described type generally prepared by the U.S. Pat. No. 4,230,841 which was incorporated herein by reference. As taught in the patent, the medium vinyl polybutadiene can be prepared by polymerizing 1,3-butadiene with a very small amount of divinyl benzene is an essentially non-polar aromatic solvent with an alkyl lithium catalyst and at least one polar catalyst modifier.

Representative examples of such solvents are pentane, hexane, heptane, octane, isooctane and cyclohexene, of which hexane is preferred.

Representative examples of alkyl lithium catalysts are methyl lithium, ethyl lithium, propyl lithium, n-butyl lithium, s-butyl lithium, t-butyl lithium and amyl butyl lithium. The n-butyl lithium is preferred.

The amount of catalyst is dependent upon the molecular weight desired for the polymerization. The amount of divinylbenzene can be related to the level of active lithium catalyst. The amount of polar compound is dependent upon the vinyl content desired in the polymer. For example, it is described in said patent that between about 0.10 and 1.0 millimols of active alkyl lithium per hundred grams of butadiene can be used and that a mole ratio of divinylbenzene (DVB) to alkyl very small amount of divinylbenzene in a hydrocarbon solvent system, preferably an essentially non-polar aprotic solvent, with an alkyl lithium catalyst, and one or more polar catalyst modifiers to effect the polymer's vinyl content. For further details concerning such type of medium vinyl polybutadiene and a method of preparation, reference may be made to U.S. Pat. No. 4,230,841 and such patent is hereby incorporated herein by reference.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread comprised of, (A) a combination of elastomers consisting essentially of cis 1,4-polybutadiene, medium vinyl polybutadiene and high vinyl polybutadiene elastomers and, based on 100 parts by weight rubber, as (i) about 10 to about 50 phr of cis 1,4-polybutadiene rubber, (ii) about 30 to about 70 phr of medium vinyl polybutadiene rubber having a vinyl content in a range of about 30 to about 60 percent and (iii) up to about 90 phr of a high vinyl polybutadiene rubber having a vinyl content in a range of about 60 to about 95; wherein the total of said medium and high vinyl polybutadiene rubbers is in a range of about 50 to about 90 phr, (B) about 50 to about 110 phr particulate silica, (C) and at least one silica coupler having a silane moiety reactive with silicon dioxide and a sulfur moiety reactive with said elastomer, in a weight ratio of silica to coupler of about 7/1 to about 15/1.

2. The tire of claim 1 where said silica is characterized by having a BET surface area in a range of about 100 to about 250 and a DBP absorption value in a range of about 200 to about 400.

3. The tire of claim 1 where the weight ratio of silica to carbon black is at least 10/1.

4. The tire of claim 1 where the said coupler is a bis-3-(triethoxysilylpropyl)tetrasulfide.

5. The tire of claim 1 where said tread also contains about 5 to about 20 phr cis 1,4-polyisoprene natural rubber.

6. The tire of claim 1 wherein said tread composition contains up to 50 phr of carbon black, wherein the weight ratio of silica to carbon black is at least 2/1 and the total of silica and carbon black is in a range of about 60 to about 120 phr.

7. A pneumatic tire having a tread comprised of, (A) a combination of elastomers consisting essentially of cis 1,4-polybutadiene, medium vinyl polybutadiene and high vinyl polybutadiene elastomers present and, based on 100 parts by weight rubber, as (i) about 10 to about 50 phr of cis 1,4-polybutadiene rubber, (ii) up to about 90 phr of medium vinyl polybutadiene rubber having a vinyl content in a range of about 30 to about 60 percent and (iii) about 40 to about 70 phr of a high vinyl polybutadiene rubber having a vinyl content in a range of about 60 to about 95; wherein the total of said medium and high vinyl polybutadiene rubbers is in a range of about 50 to about 90 phr, (B) about 50 to about 110 phr particulate silica, and (C) at least one silica coupler having a silane moiety reactive with silicon dioxide and a sulfur moiety reactive with said elastomer, in a weight ratio of silica to coupler of about 7/1 to about 15/1.

8. The tire of claim 7 where the weight ratio of silica to carbon black is at least 10/1.

9. The tire of claim 7 where the said coupler is a bis-3-(triethoxysilylpropyl)tetrasulfide.

10. The tire of claim 7 where said tread also contains about 5 to about 20 phr cis 1,4-polyisoprene natural rubber.

11. The tire of claim 7 wherein said tread composition contains up to 50 phr of carbon black, wherein the weight ratio of silica to carbon black is at least 2/1 and the total of silica and carbon black is in a range of about 60 to about 120 phr.

* * * * *